(12) United States Patent
Mansfield et al.

(10) Patent No.: US 12,177,944 B2
(45) Date of Patent: Dec. 24, 2024

(54) FLATBED TRAILER DE-ICING SYSTEMS

(71) Applicant: Kipper Noah LLC, Henderson, NV (US)

(72) Inventors: Theodore David Mansfield, Charleston, WV (US); Laurence Jay Levine, Henderson, NV (US); Blake Naccarato, Las Vegas, NV (US)

( * ) Notice: Subject to any disclaimer, the term of this patent is extended or adjusted under 35 U.S.C. 154(b) by 0 days.

(21) Appl. No.: 17/670,515

(22) Filed: Feb. 14, 2022

(65) Prior Publication Data
US 2023/0262844 A1 Aug. 17, 2023

(51) Int. Cl.
  *H05B 1/02* (2006.01)
  *B60R 16/03* (2006.01)
  *H05B 3/36* (2006.01)

(52) U.S. Cl.
  CPC ........... *H05B 1/0236* (2013.01); *B60R 16/03* (2013.01); *H05B 3/36* (2013.01); *H05B 2203/007* (2013.01); *H05B 2203/013* (2013.01); *H05B 2214/02* (2013.01)

(58) Field of Classification Search
  USPC ....... 219/202, 209, 217, 212, 211, 494, 528, 219/553, 552, 541, 538, 529
  See application file for complete search history.

(56) References Cited

U.S. PATENT DOCUMENTS

| | | | |
|---|---|---|---|
| 3,806,702 A * | 4/1974 | Spencer | G05D 27/02 392/338 |
| 4,499,365 A | 2/1985 | Puziss | |
| 4,967,057 A * | 10/1990 | Bayless | H05B 3/36 392/435 |
| 5,003,157 A * | 3/1991 | Hargrove | G02B 6/0005 392/435 |
| 5,854,470 A | 12/1998 | Silva | |
| 6,051,812 A | 4/2000 | Walker | |
| 6,278,085 B1 * | 8/2001 | Abukasm | H05B 3/36 219/544 |
| 6,483,086 B1 * | 11/2002 | Wolff | H05B 3/36 219/528 |
| 6,696,674 B1 * | 2/2004 | Doornsbosch | H05B 3/36 219/528 |
| 6,946,621 B1 | 9/2005 | Roseman | |
| 7,783,400 B1 | 8/2010 | Zimler | |
| 8,276,972 B2 | 10/2012 | Domo et al. | |
| 9,290,890 B2 | 3/2016 | Naylor et al. | |
| 9,475,466 B2 | 10/2016 | Kowalk | |
| 10,392,810 B1 * | 8/2019 | Demirkan | H05B 3/36 |
| 10,759,393 B2 | 9/2020 | Carroll | |

(Continued)

FOREIGN PATENT DOCUMENTS

| | | | |
|---|---|---|---|
| CN | 106394607 A | 2/2017 | |
| DE | 102010032637 A1 * | 3/2011 | ............ B60J 7/0092 |

*Primary Examiner* — Phuong T Nguyen
(74) *Attorney, Agent, or Firm* — The Thornton Firm, LLC (57) ABSTRACT

A system for preventing the formation of ice or removing ice from an undercarriage or roof of an automotive vehicle such as a truck or a trailer. The system comprises a combination of a network of a plurality of conductive heating elements. The system can be implemented on the undercarriage or roof without altering the configuration of the undercarriage or roof by attaching the system to a deck and cross beams of the undercarriage or roof. The system is powered by an auxiliary power unit and controlled by a thermostatic controller.

20 Claims, 9 Drawing Sheets

(56) References Cited

U.S. PATENT DOCUMENTS

| | | | | |
|---|---|---|---|---|
| 2003/0183620 A1* | 10/2003 | Wong | ........................ | H05B 3/34 |
| | | | | 219/549 |
| 2004/0035853 A1* | 2/2004 | Pais | ........................ | H05B 3/36 |
| | | | | 392/432 |
| 2008/0246252 A1* | 10/2008 | McDonald | ............... | B60J 7/102 |
| | | | | 219/202 |
| 2010/0147821 A1* | 6/2010 | Kaesler | .................... | H05B 3/34 |
| | | | | 219/202 |
| 2011/0036823 A1* | 2/2011 | Nelson | ................... | B60J 7/0092 |
| | | | | 219/202 |
| 2011/0259866 A1* | 10/2011 | Nelson | ..................... | B60J 7/102 |
| | | | | 219/202 |
| 2012/0013433 A1* | 1/2012 | Rauh | ........................ | H01C 13/00 |
| | | | | 174/128.1 |
| 2014/0217079 A1* | 8/2014 | Nelson | ..................... | H05B 3/26 |
| | | | | 219/202 |
| 2016/0060871 A1* | 3/2016 | Kulkarni | .............. | H05B 1/0252 |
| | | | | 219/528 |
| 2016/0100457 A1* | 4/2016 | Cole | ......................... | E01H 5/10 |
| | | | | 219/213 |
| 2016/0369466 A1* | 12/2016 | Chi-Hsueh | ................. | E01H 5/10 |
| 2017/0335523 A1* | 11/2017 | Moussa | ................. | E01C 11/265 |
| 2018/0002024 A1* | 1/2018 | Brelati | ...................... | H05B 3/26 |
| 2019/0263361 A1* | 8/2019 | Carroll | ...................... | B60S 1/66 |
| 2019/0297677 A1* | 9/2019 | Ito | ............................ | H05B 3/20 |
| 2020/0305239 A1* | 9/2020 | Wu | ........................... | H05B 3/18 |

* cited by examiner

ETCHED FOIL

KAPTON

PREFORMED

WIRE WOUND

FLATBED TRAILER DE-ICING SYSTEMS

TECHNICAL FIELD

The invention is related in general to systems that prevent the formation of ice, or de-ice, and/or melt snow and ice of the undercarriage or roof of an automobile such as a commercial truck or a vehicle. The invention is specifically related to an electrical system of electric heating elements that will sufficiently melt the ice on a trailer bed and keep cargo from freezing to an aluminum deck. Unlike some other previously cited systems our electrical system does not require altering or modifying the roof structure or the undercarriage of the commercial trailers and commercial vehicles. We will not be grooving or troughing or indenting the roofs or undercarriage of the commercial trailers and commercial vehicles.

BACKGROUND

Currently, many truckers in the ground transportation industry have been faced with the dangerous situation of loading and unloading cargo in freezing and icy conditions. In addition, ice and snow have often gathered on the roof of a dry van and serves as a hazard to passing cars as it falls off. De-icing, particularly during loading and unloading, according to the Department of Transportation (DOT), in 2019 September through May, falls from the flatbed resulted in 5,000 fatalities and almost 80,000 serious injuries. Many of these are a result of snowy and icy conditions. The cost in medical care and workman's comp payments, as well as disability payments is enormous with significant costs to the insurance and trucking industry.

In addition, significant damage to cargo has occurred due to falling cargo from the flatbed and personal hammering on the cargo to break ice. Significant snow and ice, which builds up on the roof of the dry van, has resulted in serious injuries and death to passing motorists, as well as hundreds of millions of dollars in property damage and medical claims. Various states have tried to enact laws and place fines on drivers who fail to clean off the roof of the dry van, but this is a difficult standard to enforce. Occupational Safety and Health Administration (OSHA) safety laws may forbid drivers from climbing up on the 13.6" foot high roof, which can result in death and disability to the driver. No current solution exists to alleviate the damage done by falling ice and snow to passing vehicles and OSHA laws forbid climbing the roof of a dry van, which cannot support the weight of an individual and offers no guard rails to prevent a fall. Currently, there lacks any remedy to prevent ice formation on a flatbed and the roof of the dry van.

Improvements regarding the issue that are known in the prior art are provided below.

Patent with publication number U.S. Pat. No. 9,475,466 is related to "Navigation-linked vehicle de-icer or debris-remover control". The device of the invention comprises a vehicle navigation unit in communication with a snow removal element. The systems and methods of the present disclosure can have the benefit of removing snow or ice from a vehicle exterior surface before the vehicle arrives at a destination such as a storage garage, thereby minimizing the deposition of snow or ice at the destination.

Patent with publication number U.S. Pat. No. 9,290,890 is related to "Heating unit for direct current applications". The heating unit includes a first pliable outer layer and a second pliable outer layer. The heating unit further includes a pliable electrical heating element disposed between the first and the second cover layers and configured to convert electrical energy to heat energy and to distribute the heat energy.

Patent with publication number CN 106394607 is related to "A kind of EMU car load bogie de-icer". The invention discloses a kind of EMU cars to carry bogie de-icer, and solves the situation of EMU snow melt clearing ice technology, strong applicability, at low cost and de-icing effect are good with heating power de-icing method design de-icer without changing the structure of existing motor train unit bogie and underbody.

Patent with publication number U.S. Pat. No. 10,759,393 is related to "Snow and ice removal device". The device of the invention may include one or more, heating elements. A control unit may be configured to control the heating element to produce heat. A power source may be in electrical communication with the control unit and the heating element. Heat may be applied to the roof surface by the heating element to loosen and/or melt accumulated ice or snow from the roof surface of the vehicle.

Patent with publication number U.S. Pat. No. 7,783,400 is related to "Smart car ice and snow eliminator". The system allows consumers to remotely activate the ice and snow elimination system in Standard Sentry Mode to keep the exterior car surfaces free of ice and snow.

Patent with publication number U.S. Pat. No. 6,051,812 is related to "Snow and ice melting blanket device". The device of the invention comprises a tarpaulin including a top layer, a bottom layer and a third conductive middle layer positioned between the top and bottom layers. A sensing device senses a predetermined weight of snow and ice accumulated atop the tarpaulin causing the conductive middle layer and tarpaulin to heat up and melt the accumulated snow and ice thereby keeping the tarpaulin free of snow and ice.

Patent with publication number U.S. Pat. No. 5,854,470 is related to "Snow melting mat system". The device of the invention comprises a mat having a plurality of drain slots, a tube projecting within the mat, a pump connected to both ends of the tube for circulating heated oil, and a heating coil surrounding a portion of the tube for heating the oil within the tube during circulation.

Patent with publication number U.S. Pat. No. 4,967,057 is related to "Snow melting mat system". The device of the invention comprises individual electrically heated mats, self-regulated by use of an electrical element whose resistance varies proportionately with its temperature, used for covering walking areas to prevent accumulation of snow and ice.

Patent with publication number U.S. Pat. No. 8,276,972 is related to "Undercarriage fairing". The device of the invention comprises an airstream deflector fairing includes a rear or aft end and a lower bottom portion of the fairing includes a panel facing the ground at an angle which in turn directs an airstream passing thereunder downwardly and outwardly relative to the undercarriage and substantially at an area below a trailing axle downstream from the fairing.

Patent with publication number U.S. Pat. No. 4,499,365 is related to "Portable heater for radiantly heating the underbody of a motor vehicle". The device of the invention comprises a portable heater for radiantly heating the underbody, particularly the engine oil pan or crankcase, of a motor vehicle to facilitate starting in cold weather includes an elongate wheeled support member horizontally positionable adjacent and under the vehicle by a handle on one end of the support member; and a radiant energy generator, such as a conventional infrared lamp or an electric resistance element, is mounted on the support member and oriented to project a beam of radiant energy substantially parallel to and along the longitudinal axis of the support member to a planar reflector on the support member downstream of the generator and disposed at an angle to reflect the beam of radiant energy upwardly to portion of the vehicle underbody desired to be heated.

Patent with publication number U.S. Pat. No. 6,946,621 is related to "Automotive safety device for melting snow and ice from roadways". The device of the invention comprises an automotive vehicle safety device for melting ice and snow on roadways and in areas immediately adjacent the vehicle tires includes ductwork extending from a heater mounted adjacent the vehicle engine with the ductwork terminating at front and rear undercarriage mounted v-shaped ducts.

The above documents fail to disclose an apparatus of an electrical system connecting a plurality of heating elements installed under an automobile undercarriage or roof, without altering the configuration of the automobile undercarriage or roof, which prevents the formation of ice and/or melts snow and ice on the roof or undercarriage of a flatbed body of a trailer.

As a result, due to the inadequacies that are mentioned above and the insufficiency of the current solutions regarding the issue, an improvement is considered necessary in the technical field.

SUMMARY

The present invention is related to system(s) that prevent the formation of ice and/or melt snow and ice of the roof or undercarriage of an automobile such as a commercial truck or a passenger vehicle, without altering the configuration of the automobile or trailer undercarriage or roof. The invention is specifically related to an electrical system of electric heating elements that will sufficiently melt the ice on a trailer bed and keep cargo from freezing to an aluminum deck.

The primary goal of the invention is to de-ice or prevent ice formation on the surface of an automobile such as a commercial truck or a passenger vehicle. The automobile can be any one of but not limited to a commercial truck, a large recreational vehicle (RV), a container chaise, an office trailer, an RV bus, a lowboy trailer, an expedited truck, a hotshot flatbed, a utility trailer, a pup trailer, a steerable lowboy, Series 2500 commercial pickup trucks through 8500 commercial trucks, a fifth wheel RV, and a tractor trailer, etc.

To avoid altering the automobile configuration, the system uses the aluminum deck, and steel cross bearings and roof of the dry van to support an electrical system of heating elements, such as flexible silicone heaters. The heating elements attached to an automobile undercarriage or roof such as an aluminum deck are connected to an auxiliary power unit (APU) generator and forms an electrical de-icing system. If future electric trucks are manufactured, this system will easily coordinate with improved truck batteries and/or generators. This concept can also be applied to the roof of the automobile or dry van to prevent snow and ice buildup. Here, the heating elements, which come with a built-in pressure sensitive thermal conductive adhesive, can be directly applied to the automobile surface such as the roof or undercarriage to keep it warm; to prevent ice buildup and/or de-ice existing buildup. These heating elements will add only two millimeters of height to the roof of the dry van, but can be applied also to the undersurface of the roof, should height limitations prevail.

In order for the aims of the present invention to be achieved, the invention comprises a de-icing system, wherein the system comprises: a surface of an automobile undercarriage or an automobile roof; an auxiliary power unit; a temperature controller; a switch unit coupled to the auxiliary power unit and the temperature controller; an electrical system, the electrical system comprising a plurality of heating elements coupled to the auxiliary power unit and temperature controller, wherein the plurality of heating elements are linked to each other via a heating relay system of heat conductive wire, wherein the heating elements are arranged in a pattern; and a plurality of heat sensors placed along electrical heat sensor wiring; wherein the heat conductive wire and the electrical heat sensor wiring are encapsulated by a rubber insulation layer.

In further embodiments, the de-icing system further comprises wherein the plurality of heating elements comprise silicone heaters and built-in thermal conductive adhesive.

In further embodiments, the de-icing system further comprises wherein the silicone heaters comprise at least one of a thermostat, a resistance temperature detector, a heating element, and a thermal fuse.

In further embodiments, the de-icing system further comprises wherein the silicone heaters are a wire-wound style or flexible silicone heaters.

In further embodiments, the de-icing system further comprises wherein the thickness of each of the plurality of heating elements is in a range of 0.0056-0.022 inches.

In further embodiments, the de-icing system further comprises wherein the thermal conductive adhesive has a continuous operating temperature up to 180 degrees Fahrenheit.

In further embodiments, the de-icing system further comprises wherein the auxiliary power unit provides voltage in a range of 6 to 240 volts.

In further embodiments, the de-icing system further comprises wherein the voltage is provided in a form of alternating current, wherein a phase of the voltage is either single or three-phase.

In further embodiments, the de-icing system further comprises wherein the voltage is provided in a form of direct current.

In further embodiments, the de-icing system further comprises wherein an insulator is added to one side of each of the silicone heaters, wherein the insulator is selected from at least one of aluminum and silicone.

In further embodiments, the de-icing system further comprises wherein the plurality of heating elements are polyimide heaters, the polyimide heaters comprising a thin etched foil circuit laminated between two lightweight polyimide films.

In further embodiments, the de-icing system further comprises the plurality of heating elements are in a number from 12 to 20.

In further embodiments, the de-icing system further comprises further comprising a temperature display connected to the temperature-controller.

In further embodiments, the de-icing system further comprises wherein a temperature of the surface is maintained between 75 and 110 degrees Fahrenheit.

In further embodiments, the de-icing system further comprises wherein the pattern comprises a plurality of rows and a plurality of columns.

In further embodiments, the de-icing system further comprises wherein spacing distances between each of the heating elements are the same in any of the rows or the columns, or spacing distances between some or all of the heating elements are different in any of the rows or the columns.

In further embodiments, the de-icing system further comprises wherein the heating elements are arranged external to an insulation layer, and the insulation layer is arranged external to an exterior roof.

In further embodiments, the de-icing system further comprises wherein the heating elements are arranged between an exterior roof and an interior roof, wherein an insulation layer is arranged between the heating elements and the interior roof.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

FIGS. 5A and 5B provide additional embodiments of the installation of the electrical system.

The drawings do not need to be necessarily scaled and the details that are not required for understanding the present invention may be overlooked. In addition to that, the elements that are identical at least in a large extent or which have functions that are identical at least in a large extent are represented with the same number.

DESCRIPTION OF THE PART REFERENCES

1. Surface of an automobile undercarriage or automobile roof
2. Electrical wiring
3. Heating elements
4. Auxiliary power unit (APU)
5. Thermostatic Temperature controller
6. Switch unit
12. Temperature sensors
13. Temperature display
14. Pigtail wire connection
16. Temperature sensor wiring
17. APU connection and commercial generator connection
18. Cross beam
19. Electrical power adapter
20. Insulation layer
21. Exterior roof
22. Interior roof
23. Rubber insulation layer
24. Apron
25. Commercial standalone generator

DETAILED DESCRIPTION OF THE EMBODIMENTS

The system is to de-ice the trailer deck using an electrical system of heating elements, which comprise at least one of a thermostat, a resistance temperature detector, a heating element, and a thermal fuse. The system will sufficiently prevent and/or melt the ice on the trailer bed and keep cargo from freezing to the deck, where the deck is made from any material such as metal, alloys, composites, aluminum, steel, and any other material which functions as a deck. The scope of this invention defines de-icing as preventing the formation of snow and/or ice buildup as well as remove ice and/or snow and on any surface of a vehicle.

Figure 1:
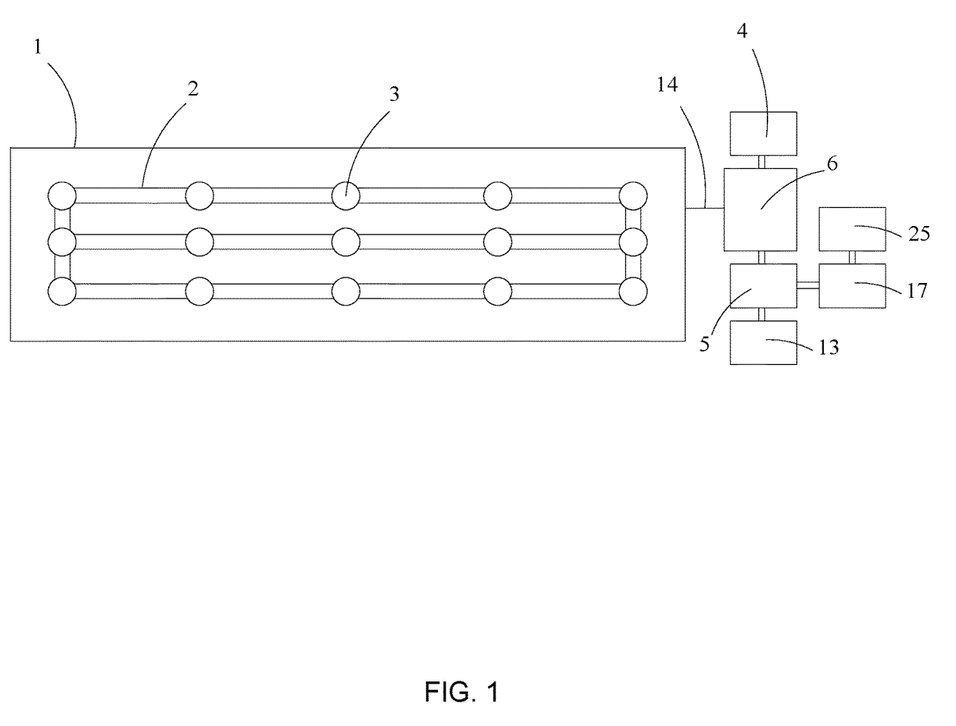
FIG. 1 shows a representative schematic view of an undercarriage of an automobile with the electrical system.

The electrical system depicted in FIG. 1 utilizes preferably between 12 and 20 heating elements 3 linked to each other via a heating relay system around the surface of an automobile undercarriage or automobile roof 1 attached to the bottom of the aluminum deck, though less than 12 or greater than 20 heating elements can certainly be used. Heat conductive wiring 2 is attached to each heating element 3. Testing must be done to determine which size of the heating elements 3 work best. The objective is to heat the surface of the automobile undercarriage or automobile roof 1 to a temperature between 75 to 110 degrees thus keeping ice from being able to form and or melting existing ice on the deck. This heating scale should prevent thermal injury to the trailer and to personnel. Existing spare switches within a switch unit 6, configured to be attached on the automobile sleeper berth as per DOT, is implemented to activate and deactivate the system. The de-icing system will be initiated to activate, e.g., current will be supplied to the heating elements 3 while the automobile such as a commercial truck or a passenger vehicle is running or when a switch from switch unit 6 connects the de-icing system to the auxiliary power unit 4. Initiating the de-icing system should be done prior to the driver arriving at the shipper or receiver. The driver should turn on the de-icing system at least 10 hours the night before or after loading or unloading of cargo, and can be done with or without the APU 4 running. Therefore, the de-icing system can be active when or after the driver arrives at the shipper or receiver. Preferably the deck should stay warm for up to two hours with the engine off.

Temperature sensors 12 are placed along temperature sensor wiring 16 and are connected to the thermostatic controller 5. Each temperature sensor 12 may be spaced along a length of the surface of the automobile undercarriage or automobile roof 1 with a distance preferably at 1.33 inches between the temperature sensors 12, and along a width of the surface of the automobile undercarriage or automobile roof 1 with a distance preferably at 10.5 inches between them. The temperature-sensors 12 will detect when the temperature reaches a low variant below 75 degrees Fahrenheit, the temperature sensors 12 will provide feedback to the thermostatic controller 5, and the thermostatic controller 5 is connected to an alert indicator which will alert the driver, via a noise and/or a light, to initiate the de-icing system again the system. Inside the automobile there will be a temperature display 13 connected to the thermostatic controller 5 to monitor the temperature of the automobile undercarriage or automobile roof 1 or flatbed. A separate pigtail wire connection 14 will be made for this system to connect between the thermostatic controller 5 on the automobile dashboard to the heating relay system on the undercarriage or roof. This de-icing system will generate heat that will keep the surface of the automobile undercarriage or roof ice free. The spacing distances (measured from an edge/outer surface of the temperature-sensors 12) between the heating elements 3 and/or the temperature sensors 12 can be smaller or larger than the above disclosed 1.33 inches and 10.5 inches, though these metrics have been tested and were unexpectedly found to be most effective and variations would reduce operating efficiency of the ability to heat the surface 1.

Figure 3:
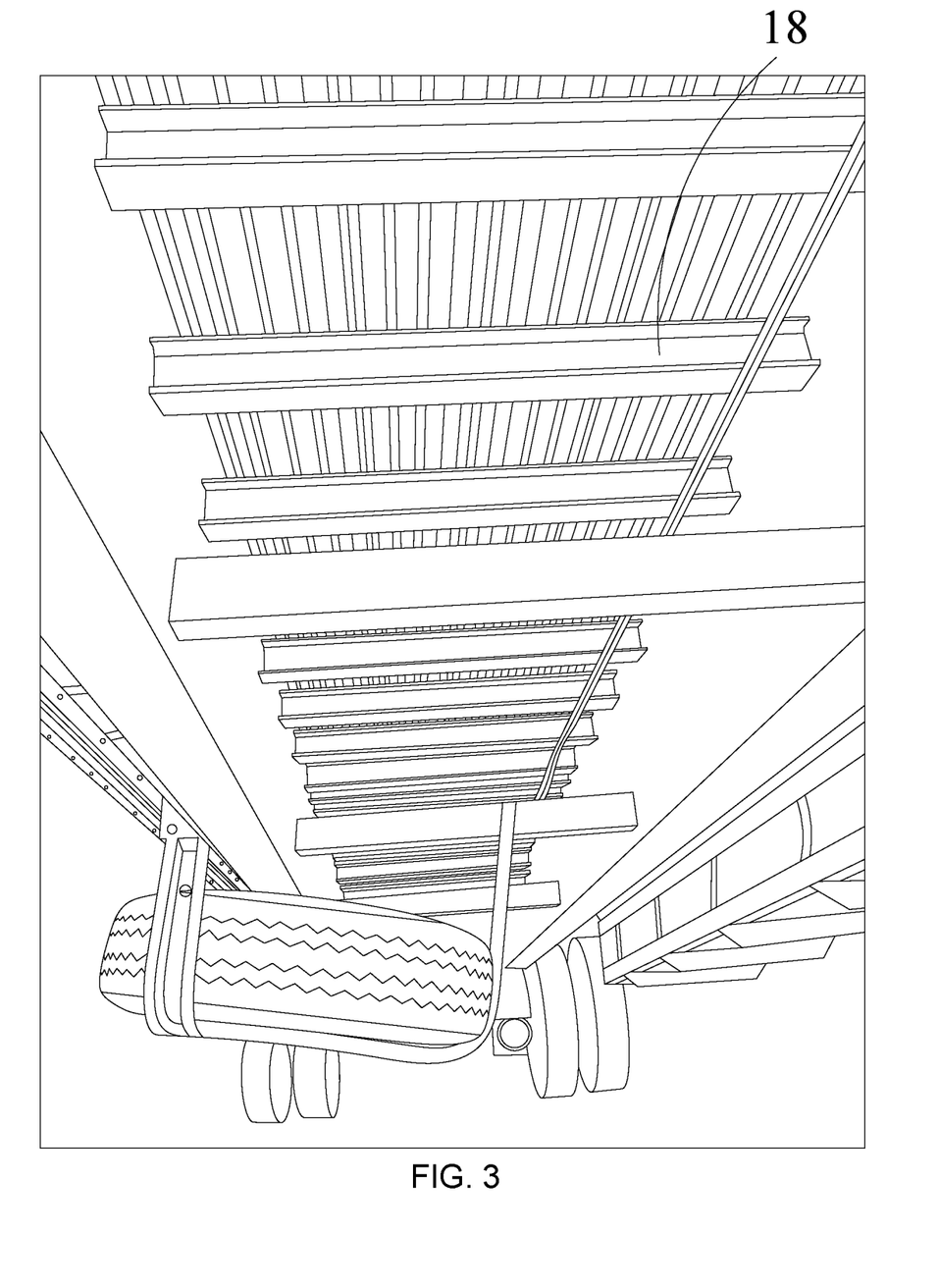
FIG. 3 depicts an example surface of an automobile undercarriage with cross beams.

There are several options of heating elements available. First, there are silicone heaters, which are beneficial in that they transfer heat uniformly and rapidly. This is because they are thinly constructed, they heat uniformly, and they are close to the surface to which they are applied. They are rugged and maintain dimensional stability. They resist moisture and chemical degradation and are compatible with flat and curved surfaces. They can be vulcanized in the factory for use on metallic surfaces. Silicone heaters can be constructed with thermostats, resistance temperature detectors (RTD), heating elements or thermal fuses, as depicted in FIG. 1. A pressure sensitive thermal conductive adhesive can be used to fasten the heater to a surface which can even activate on exposure to air. Ultimately, in the manufacturing process, heaters can be infused onto an aluminum surface, which is one example of a type of surface of an automobile undercarriage or automobile roof 1. Another type of surface is depicted in FIG. 3 consisting of a plurality of cross beams 18 for attaching the system to the automobile undercarriage such as a vehicle apron.

Figure 4A:
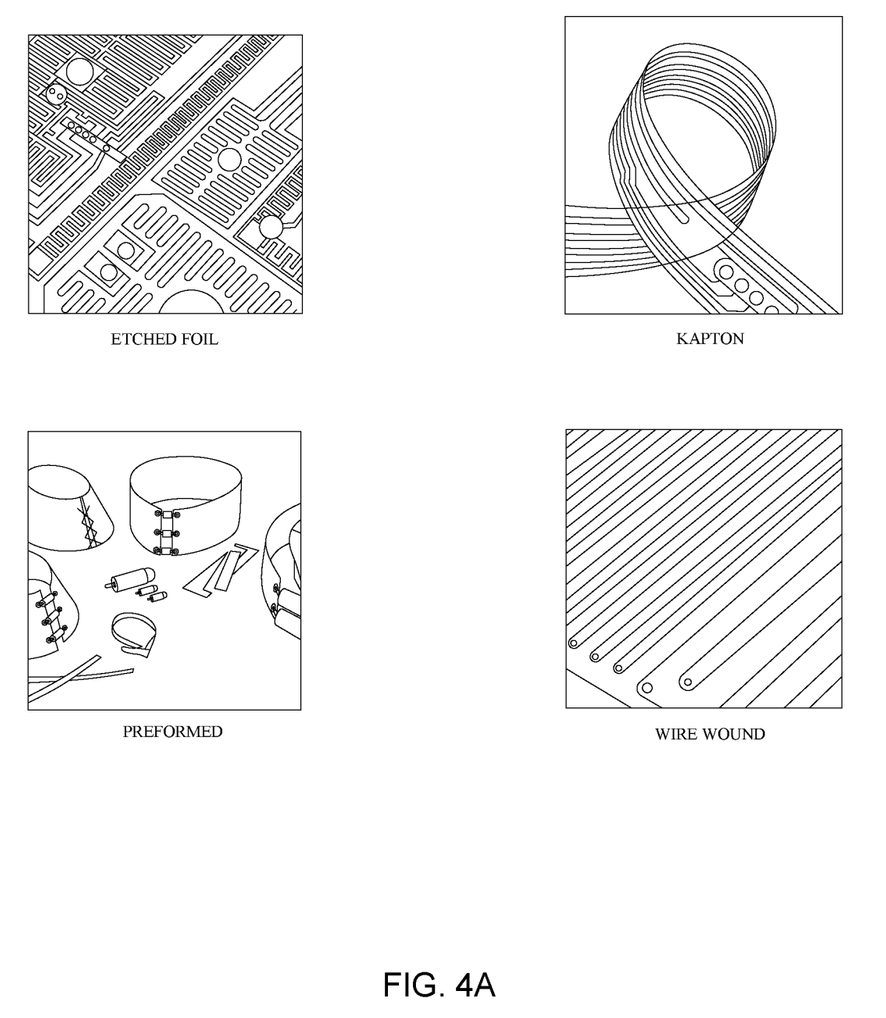
FIGS. 4A-4B provides examples of heating elements for achieving the invention, with FIG. 4A depicting examples of heaters for the heating elements and FIG. 4B depicting heaters of various shapes.
Figure 4B:
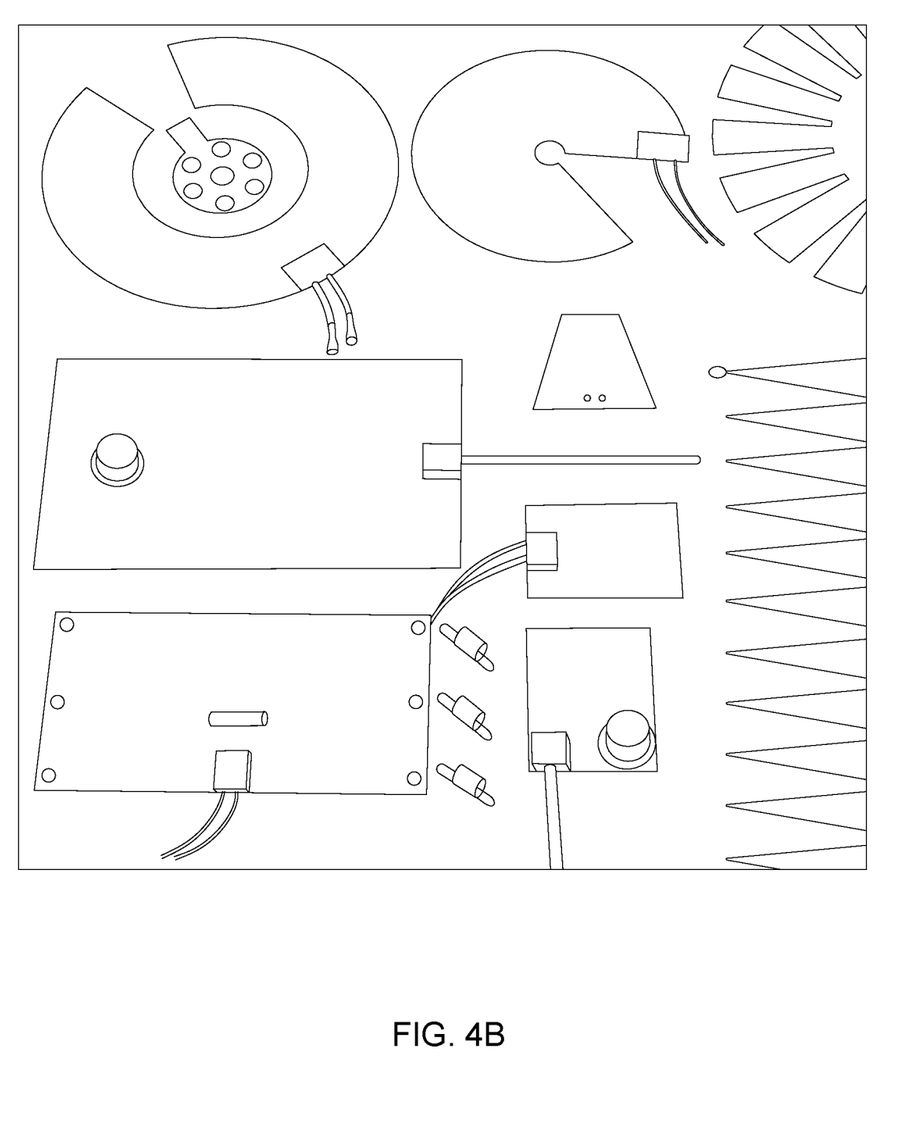

Silicone heaters are available in two types: 1) wire-wound style: a specific pattern is created using resistance wiring or etched foil, a flat circuit formed when a resistant foil is etched to a specific pattern; 2) flexible silicone heaters, which when placed can de-ice or prevent the initial ice buildup on the surface of an automobile undercarriage or automobile roof 1 or a flatbed deck. Depending on the heating elements 3, the thickness can range from 0.022-0.0056 inches. Heat is created by resistance to the electric current passing through each heating element 3. Silicone heaters can be custom designed to any size or shape such as circles, rectangles, or any polygon shape or any geometric shape. Examples are depicted in FIGS. 4A-4B. Silicone heaters can have a continuous operating temperature up to about 180 degrees Fahrenheit, far above the actual need. Heat loss can be prevented by adding aluminum or additional silicone insulation to any number of sides or edges that are exposed to the ambient. Silicone is also an excellent insulator. This invention employs temperatures in the 75-110 degrees Fahrenheit range, but will be able to vary the temperature based on the outside ambient temperatures and the time needed to de-ice. Further, the heating elements 3 may also be set overnight to a temperature above freezing, preferably in the 50-70 degree Fahrenheit range, more preferably at 60 degrees Fahrenheit.

Flexible heaters meet all industry standards: UL, large VDE, large IEC, large NEC, ISO or NFPA standards. Voltage can range from 6 volts to 240 volts, alternating current (AC) or direct current (DC), single or 3 phase. The temperature output is controlled by thermal limiting devices, such as a thermostat, a resistance temperature detector, a heating element, or a thermal fuse, wired directly into the heaters and controlled by external temperature controllers. The source of the power is the APU, which can run overnight and generate the necessary heat to prevent ice build-up. This generator may be part of the truck or can be used in the loading areas on a standby basis to plug into the silicone heater layout. As electrical truck technology develops, this system will fit into advancing battery technologies coming in the future.

Temperature-sensors 12 are placed along the surface of the automobile undercarriage or automobile roof 1 attached to the temperature-sensor wiring 16 to ensure safe adequate heating. The wiring 16 will run from the truck's batteries to a pigtail wire connection 14 on the trailer. A switch within switch unit 6 on the automobile dashboard will be used to turn the system on and off.

Figure 2:
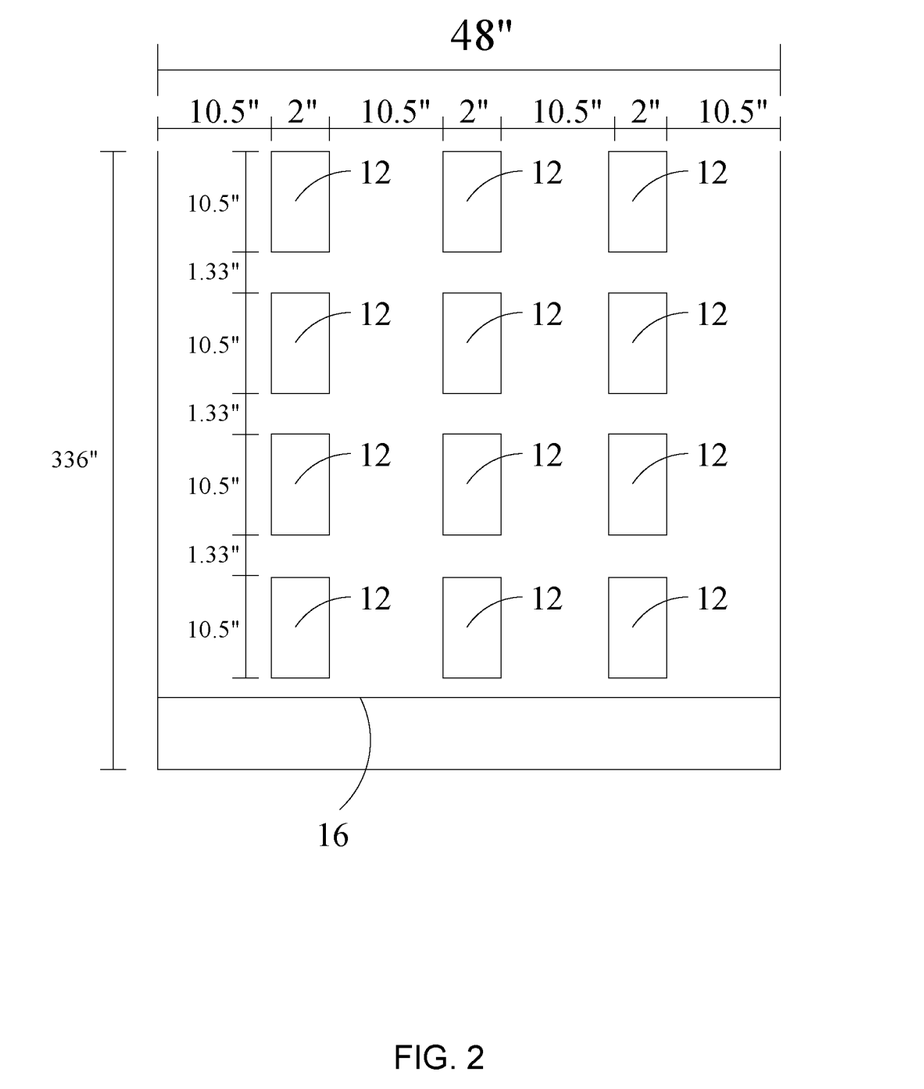
FIG. 2 shows an arrangement of the heating elements along the surface of the automobile undercarriage.

Further, a pattern of the conductive heating elements 3 comprises a plurality of rows and a plurality of columns on the surface 1, as depicted in FIG. 2. The heating elements 3 are arranged in an array that are M columns by N rows (M is 3 and N is 4 in FIG. 2) on the surface 1. The spacing distance between each of the heating elements 3 may have the same spacing distance or may have different spacing distances between some or all of the heating elements 3 in any of the rows or columns. Combined, these two systems provide a safer and more stable work environment for drivers when confronted with icy conditions. They will also help save insurance companies millions of dollars in losses. This concept will improve worker efficiency at any loading and unloading site and reduce the risk of workers falling of the trailer.

FIG. 1 also depicts APU connection and commercial generator connection 17 with connection to commercial standalone generator 25. As displayed, connection 17 is connected to the thermostatic controller 5. This element provides the primary source of power to the electrical system the de-icing system when the automobile is running, and when it is not running, the de-icing system will source its power from the auxiliary power unit 4 by activating a switch in switch unit 6.

In one embodiment, the electrical system utilizes a specially designed series of silicone heaters affixed via a pressure sensitive thermal conductive adhesive, which is high temperature rated to 180 degrees Fahrenheit, is permanent and all weather. Depending on the size of the automobile such as a commercial truck or a passenger vehicle, 53', 48' or 28', this invention uses a series of 12 to 20 custom designed silicone heaters. Each heating element sized 18" wide by 82" long is attached to the automobile, e.g., truck or trailer, roof or undercarriage surface. The heating elements 3 are easily installed with (i.e. due to) the adhesive. Alternative methods of installing or attaching the heating elements 3 are fixing with screws, rivets, brackets, glue, etc., and installation can be done to either the roof or the undercarriage of the automobile. In an example cited below for a 28 foot dry-van, each custom-built heating element is constructed of:

1. Flexible silicone heater panel with 2 ply woven glass tech style reinforced silicone rubber;
2. Etched foil heating elements for even heating;
3. Twelve heating elements, each sized 18"×82". These will be spaced in three rows of four each to distribute heat uniformly where needed, similar to the embodiment depicted in FIG. 2;

4. All weather pressure sensitive thermal conductive adhesive backing;
5. 120 volt operation;
6. Power is 305 watts per each heating element, 3600 watts total;
7. Power leads—72" long, exit corner of long side;

Another source of ice build-up prevention is a ground thaw heating blanket, which can be attached to the surface of the automobile undercarriage or automobile roof 1. These blankets provide higher watt densities, dispensing heat uniformly across the entire surface of the automobile undercarriage or automobile roof 1. When combined with an adjustable or fixed thermostatic controller 5, they can raise temperatures as high as 145 degrees F. and can be used in temperatures as low as −20 degrees F. These are easily installed with grommets or fasteners. Polymide heaters can also be used. They consist of a thin etched foil circuit, laminated between two light weight polymide films that provide high dielectric strength, superior resistance and low outgas characteristics. These can be custom designed distributing wattage heat profiles to the aluminum roof and can be also made with a pressure sensitive thermal conductive adhesive.

A summary of possible heaters for the heating elements 3 are provided in FIGS. 4A-4B. FIG. 4A depicts etched foil heaters, polyimide or Kapton heaters, preformed heaters, and wire wound heaters as examples that can be implemented within the heating elements 3. The heaters shown can be provided in multiple shapes as well, such as circles, rectangles, or various polygons, provided in FIG. 4B. The heating elements 3 do not require to be placed in grooves to be attached to the surface 1. Instead, as discussed above, the heating elements 3 can be installed through fixing with screws, rivets, brackets, glue, etc., and installation can be done to either the roof or the undercarriage of the automobile. The surfaces of the roof or undercarriage of the automobile can be planar, e.g., flat, or with ridges or grooves as depicted on the apron 24 in FIG. 3, and can be a smooth or rough surface. The surfaces are most likely to be made of aluminum, steel, or composites of various metals.

Figure 5A:
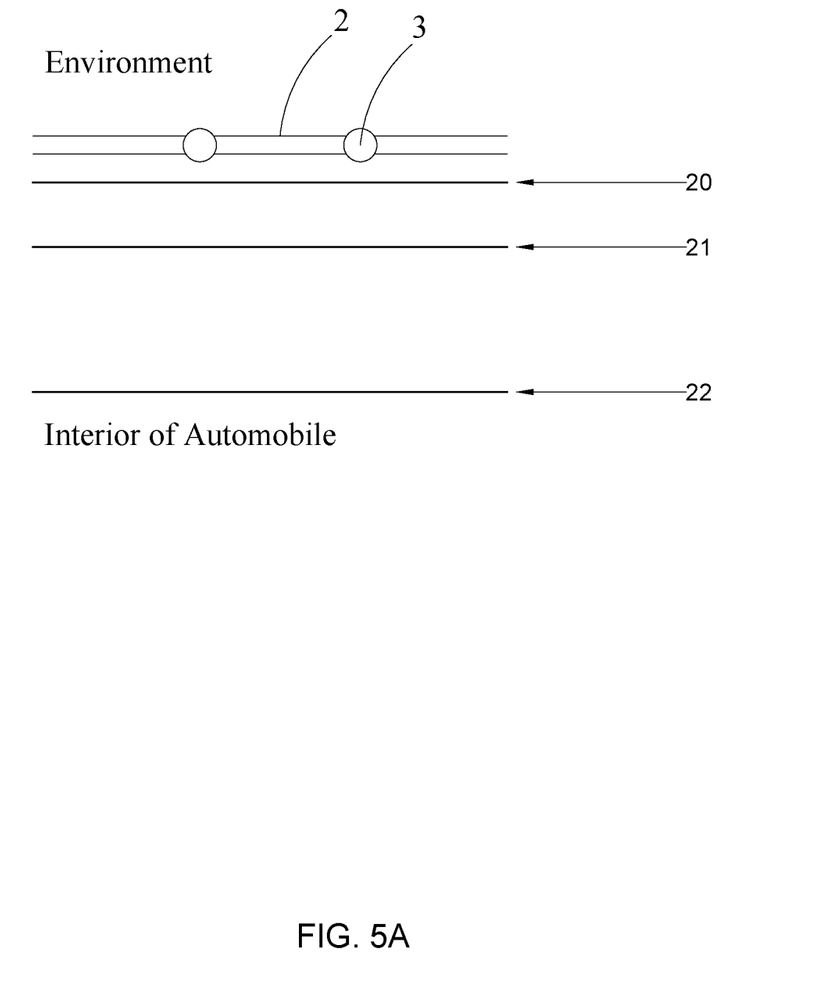
FIG. 5A depicts an external application and FIG. 5B depicts an internal application of the heating elements arranged with an insulation layer.
Figure 5B:
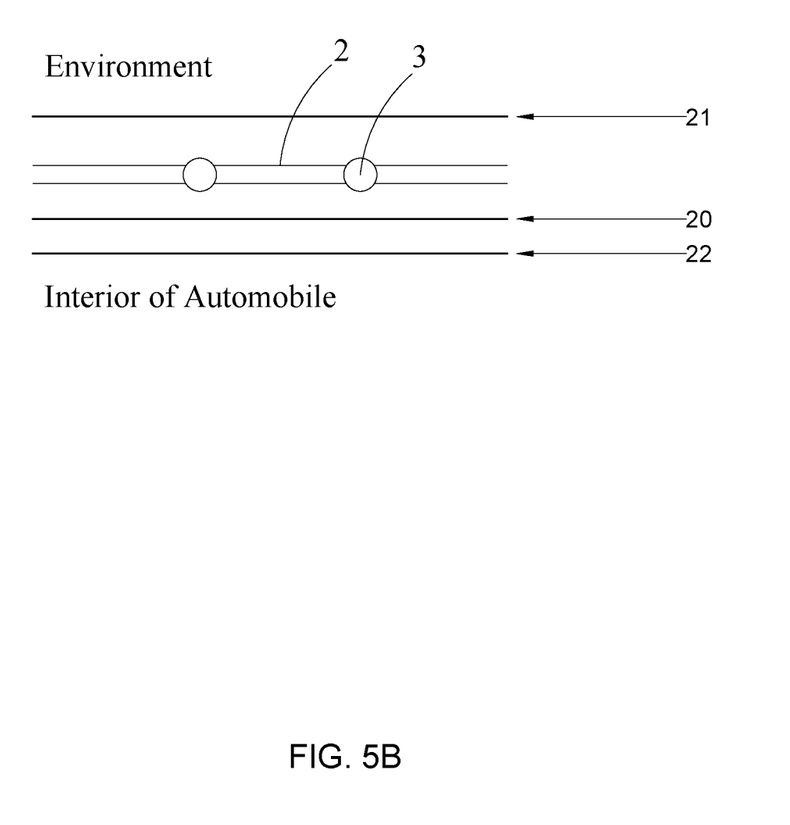

FIGS. 5A-5B depicts additional examples of how the electrical system can be arranged on an automobile, specifically external application (FIG. 5A) or internal application (FIG. 5B) embodiments. The external application embodiment provides installation of the electrical system, specifically the heating elements 3, exposed to the environment and external to the automobile by being outside from an exterior roof 21. This embodiment further provides an insulation layer 20 between the heating elements 3 and the exterior roof 21, e.g., the exterior of the automobile has insulation layer 20 mounted to the exterior roof 3, then the heating element 3 is mounted on the insulation layer 20 such that less heat is lost into the automobile and the heating elements 3 only melt snow on the exterior of the automobile. The internal application embodiment provides the heating elements 3 to be installed between the exterior roof 21 and an interior roof 22, wherein the insulation layer 20 is installed between the interior roof 22 and the heating elements 3 such that the heating elements 3 are in contact with the interior surface of the exterior roof 21 of the automobile. This would enable the insulation layer 20 to separate the heating elements 3 from the rest of the interior of the automobile to further prevent heat loss.

Figure 6:
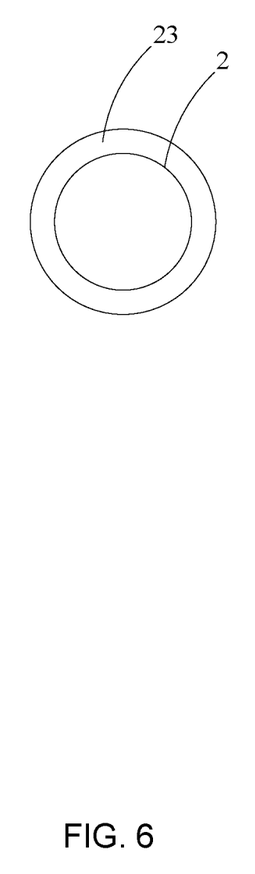
FIG. 6 depicts a cross section of the wiring system.

FIG. 6 depicts a cross-section and further details regarding the wiring system of the invention. Specifically, all wiring is encapsulated by a rubber insulation layer 23, the rubber insulation layer 23 being a closed layer, approved by the DOT. One example of such a rubber insulation layer 23 is the K-FLEX® INSUL-SHEET®, which is a polyvinyl chloride (PVC) resin blended with nitrile polymers (NBR), or an NBR/PVC based closed cell, flexible elastomeric foam insulation, though similar or equivalent materials may be used. This rubber insulation layer 23 will cover all wiring between the heating elements 3 and all wiring from the surface of an automobile undercarriage or automobile roof 1 down an apron of all types of automobiles. The rubber insulation layer 23 solves the problem of keeping condensation off of all wiring as well as the surface of an automobile undercarriage or automobile roof 1, which subsequently prevents the wiring from freezing over. The rubber insulation layer 23 also prevents sparks from the wiring and potential risks of fire that could result. This rubber insulation layer 23 will be applied to the heat conductive wiring 2, the pigtail wire connection 14 and the heat sensor wiring 16.

Figure 7:
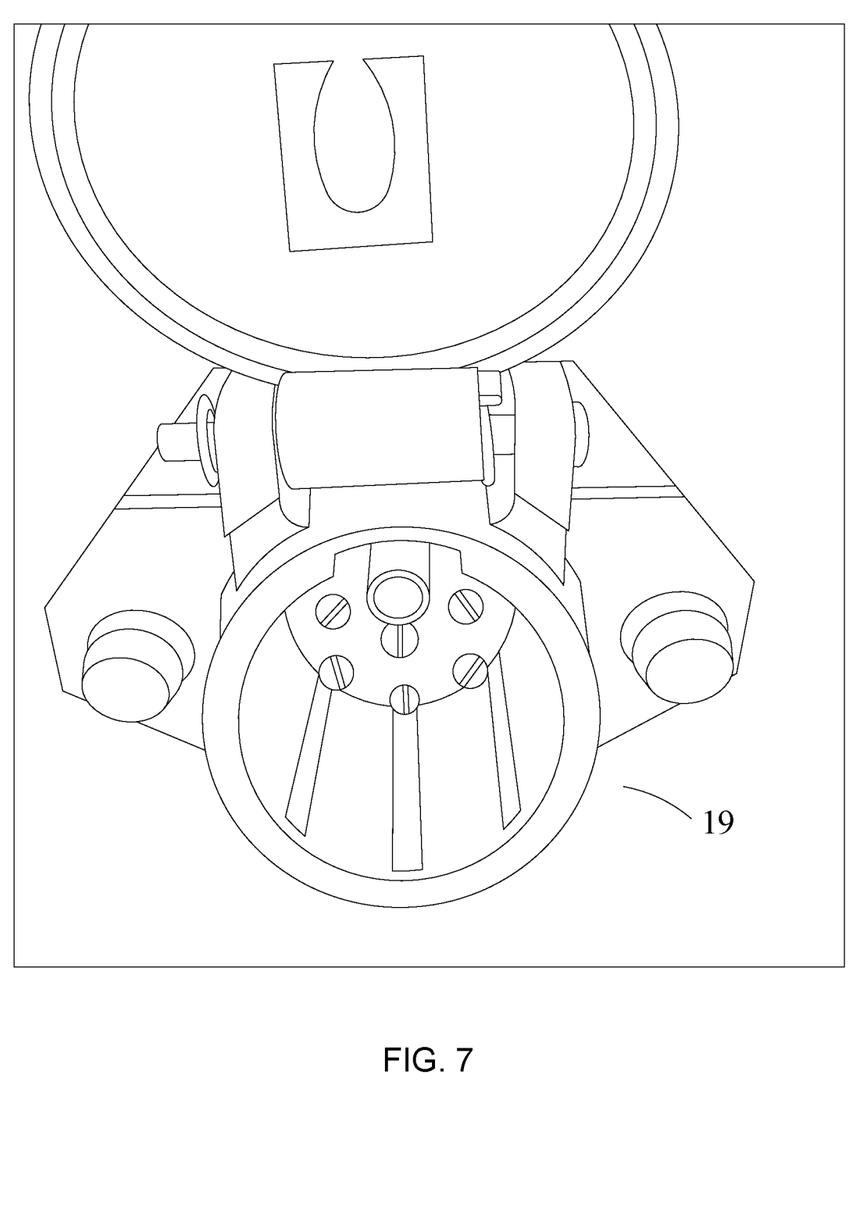
FIG. 7 depicts an example electrical power adapter for coupling the system to an APU connection and commercial generator connection.

These systems are adaptable to many platforms such as flatbed railcars, container trailers, and lowboy trailers through the use of an electrical power adapter 19 for coupling the system to an APU connection and commercial generator connection 17, such as the example provided in FIG. 7. Some examples of the electrical power adapter 19 or additional adapters are an ITT Cannon™ CA3106E18 plug, a Philips Stay Dry SAE J560, or a Tramec Sloan J560 plug. These adapters can be mounted on a side of the automobile, more specifically an apron of the automobile. The adapter can also be used to connect to the auxiliary power unit 4, one example of which can be a Dynasys™ generation III auxiliary power unit. The auxiliary power unit 4 may be mounted on a frame of the automobile and may be used when the driver of the automobile is in compliance with hours of the service rules. The adapter may also be able to connect to a generator, such as a Kubota™ GL Series 7000 generator, thus enabling the automobile to be connected to an additional external power supply when stationary during rest hours.

In conclusion we have proven the need for the concepts and how it will help ground transportation overall. Having the ability to help more than one platform helps to seek the DOT's safety mandate. These de-icing concepts will save time and money for everyone involved in the flatbed transportation sector.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:
1. A de-icing system wherein the system comprises:
a surface of an automobile undercarriage or an automobile roof;
an auxiliary power unit;
a temperature controller;
a switch unit coupled to the auxiliary power unit and the temperature controller;
an electrical system, the electrical system comprising
a plurality of heating elements coupled to the auxiliary power unit and the temperature controller, wherein the plurality of conductive heating elements are linked to each other via an electrical wire, wherein the heating elements are arranged in a pattern; and
a plurality of heat sensors placed along electrical heat sensor wiring;

wherein the electrical wire and the electrical temperature sensor wiring are encapsulated by a rubber insulation layer.

2. The de-icing system of claim 1, wherein the plurality of heating elements comprise silicone heaters and built-in thermal conductive adhesive.

3. The de-icing system of claim 2, wherein the silicone heaters comprise at least one of a thermostat, a resistance temperature detector, a thermocouple, and a thermal fuse.

4. The de-icing system of claim 2, wherein the silicone heaters are a wire-wound style or flexible silicone heaters.

5. The de-icing system of claim 2, wherein the thermal conductive adhesive has a continuous operating temperature up to 180 degrees Fahrenheit.

6. The de-icing system of claim 2, wherein an insulator is added to one side of each of the silicone heaters.

7. The de-icing system of claim 1, wherein the thickness of each of the plurality of heating elements is in a range of 0.0056-0.022 inches.

8. The de-icing system of claim 1, wherein the auxiliary power unit provides voltage in a range of 6 to 240 volts.

9. The de-icing system of claim 8, wherein the voltage is provided in a form of alternating current, wherein a phase of the voltage is either single or three-phase.

10. The de-icing system of claim 8, wherein the voltage is provided in a form of direct current.

11. The de-icing system of claim 1, wherein the plurality of heating elements are polyimide heaters, the polyimide heaters comprising a thin etched foil circuit laminated between two lightweight polyimide films.

12. The de-icing system of claim 1, wherein the plurality of heating elements are in a number from 12 to 20.

13. The de-icing system of claim 1, further comprising a thermostatic gauge connected to the thermostatic controller.

14. The de-icing system of claim 1, wherein a temperature of the surface is maintained between 75 and 110 degrees Fahrenheit.

15. The de-icing system of claim 1, wherein the pattern comprises a plurality of rows and a plurality of columns.

16. The de-icing system of claim 1, wherein spacing distances between each of the heating elements are the same in any of the rows or the columns, or spacing distances between some or all of the conductive heating elements are different in any of the rows or the columns.

17. The de-icing system of claim 1, wherein the heating elements are arranged external to an insulation layer, and the insulation layer is arranged external to an exterior roof.

18. The de-icing system of claim 1, wherein the heating elements are arranged between an exterior roof and an interior roof, wherein an insulation layer is arranged between the heating elements and the interior roof.

19. The de-icing system of claim 1, wherein the temperature sensors are spaced along a length of the surface of the automobile undercarriage or the automobile roof with a distance of 1.33 inches between each of the temperature sensors.

20. The de-icing system of claim 19, wherein the temperature sensors are spaced along a width of the surface of the automobile undercarriage or automobile roof with a distance of 10.5 inches between each of the temperature sensors.

* * * * *